May 15, 1956 T. D. DAVIES ET AL 2,745,664

CARD MARKING DEVICE

Filed March 17, 1953 4 Sheets-Sheet 1

INVENTORS
THOMAS D. DAVIES
CLAYTON J. PERRY
BY [signature]
[signature]
ATTORNEYS May 15, 1956 T. D. DAVIES ET AL 2,745,664

CARD MARKING DEVICE

Filed March 17, 1953 4 Sheets-Sheet 2

INVENTORS
THOMAS D. DAVIES
CLAYTON J. PERRY
BY [signature]
ATTORNEYS

CARD MARKING DEVICE

Filed March 17, 1953

INVENTORS
THOMAS D. DAVIES
CLAYTON J. PERRY
BY [signature]
[signature]
ATTORNEYS May 15, 1956 T. D. DAVIES ET AL 2,745,664

CARD MARKING DEVICE

Filed March 17, 1953 4 Sheets-Sheet 4

INVENTORS
THOMAS D. DAVIES
CLAYTON J. PERRY
BY [signature]
ATTORNEYS 2,745,664

CARD MARKING DEVICE

Thomas D. Davies, United States Navy, and Clayton J. Perry, Jacksonville, Fla.

Application March 17, 1953, Serial No. 343,000

8 Claims. (Cl. 271—3)

Figure 1:
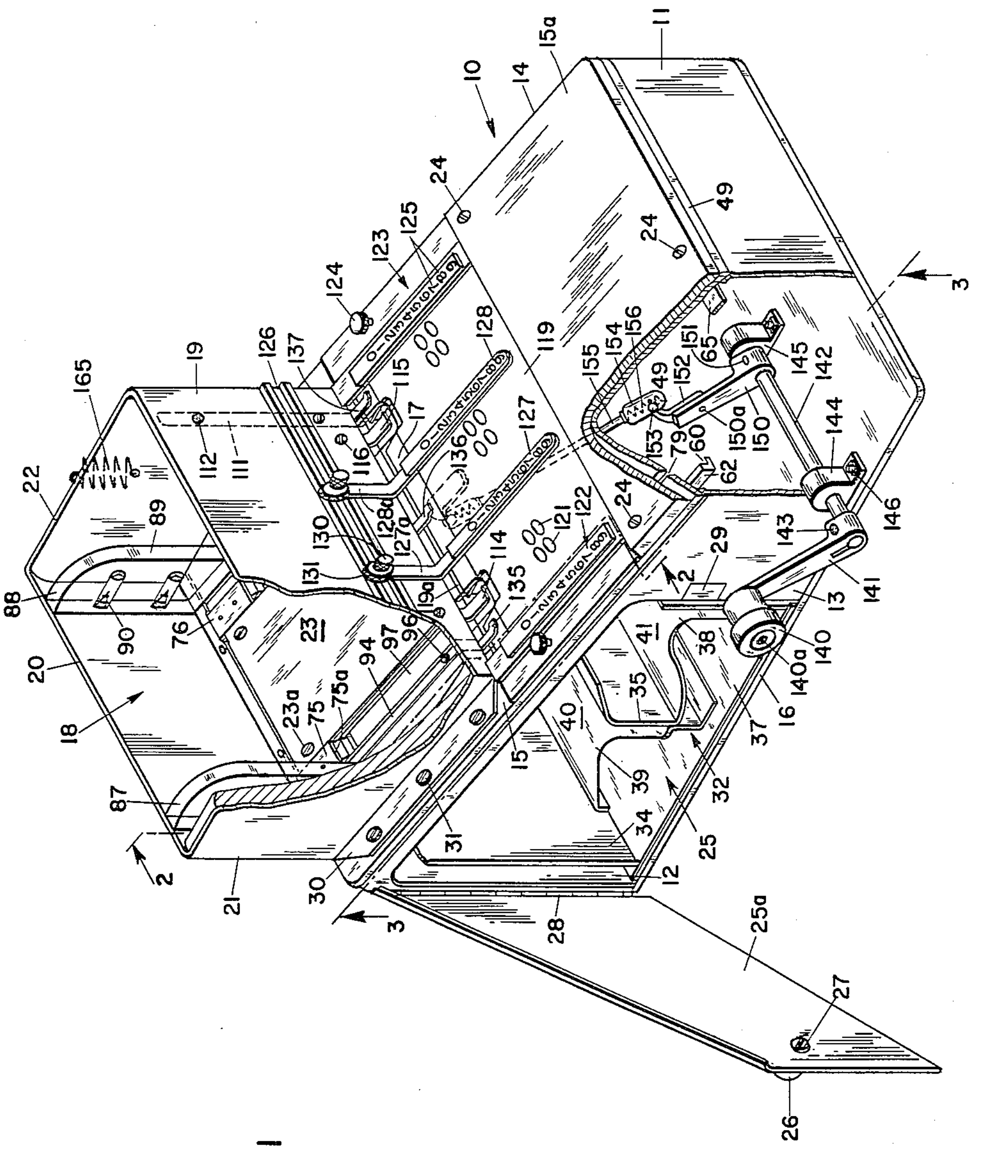

(Granted under Title 35, U. S. Code (1952), sec. 266)

The invention described herein may be manufactured and used by or for the Government of the United States of America for governmental purposes without the payment of any royalties thereon or therefor.

This invention relates to a device for marking record cards and is particularly concerned with a card marking device wherein record cards contained in a card supply space are individually and consecutively propelled first to a card marking surface, and then from such surface to a card receiving space.

The record cards mentioned above are preferably of the type employed for tabulating purposes and known as "mark-sense" cards. Such cards are provided with different columns, each having a selected number of index point positions distributed vertically of the column. After the cards have been marked by pencil in the proper places, they are inserted in certain machines of known type which punch the cards and tabulate the information thereon in accordance with the above noted pencil marks.

In industrial establishments such as shops, the direct transmission of data from its source directly to the punch card system is highly desirable. The use of handwritten reports, records or logs can be eliminated by having personnel mark original data previously recorded in this fashion directly on the "mark-sense" card. While these "mark-sense" cards have proved useful, e. g. in shops, for data recording purposes, certain drawbacks have heretofore considerably limited their application in this field. Thus, shop employees often handle the cards with greasy or dirty hands, transmitting this grease and dirt to the cards and soiling them. Moreover, during such handling and in the environment of the shop, the cards often become creased, torn and mutilated, rendering them unfit for use in the punch-card system. Further, personnel marking such cards are inclined to make errors by selecting and marking in the wrong columns and by making the marks too long, too short, too light or outside limits which cannot be properly "sensed" by the punch-card machine.

One object of this invention is to provide a card marking device, particularly for use with the well known "mark-sense" cards.

Another object of this invention is the provision of a card marking device which involves minimum handling of the cards by the persons marking them thus preventing soiling, creasing and mutilation of the cards, and which increases the accuracy of card marking.

A particular object of this invention is to provide a card marking device having a space for carrying a supply of cards, means for transferring a single card therefrom onto a card marking surface and means for conducting a card from the marking surface to a card receiving space, each card being handled consecutively in this manner.

Yet another object is to afford a compact card marking device which is comparatively simple and inexpensive, is easily operated and is of sturdy and durable construction.

Figures 2, 2A:
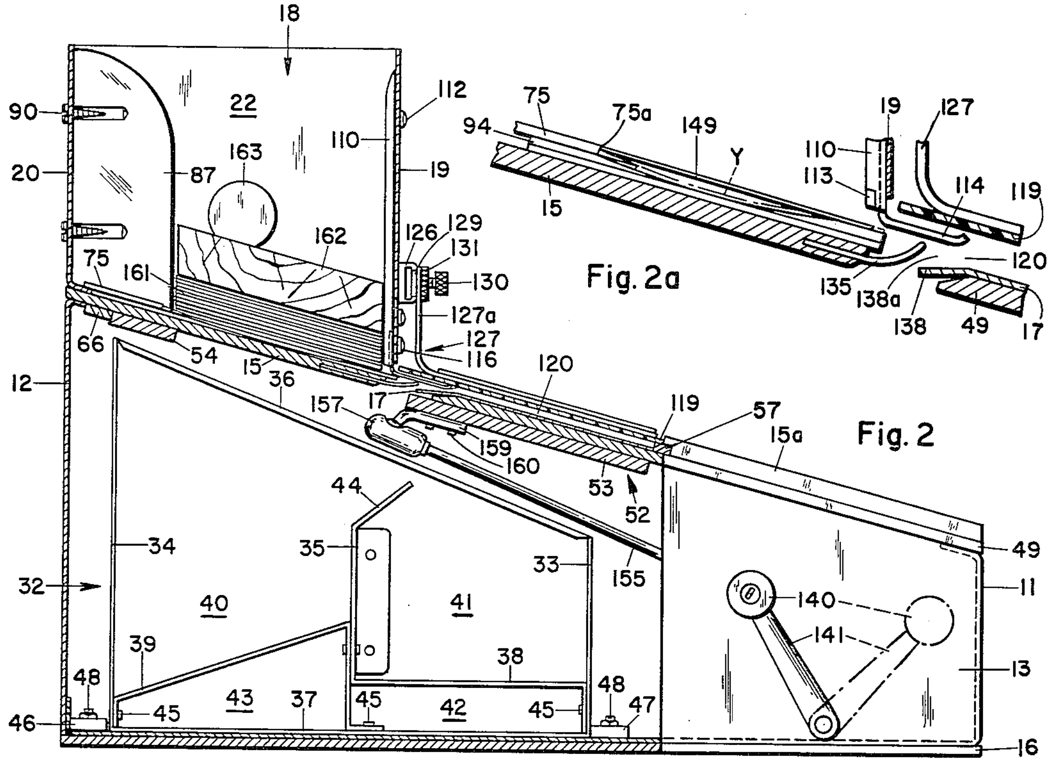
Figure 6:
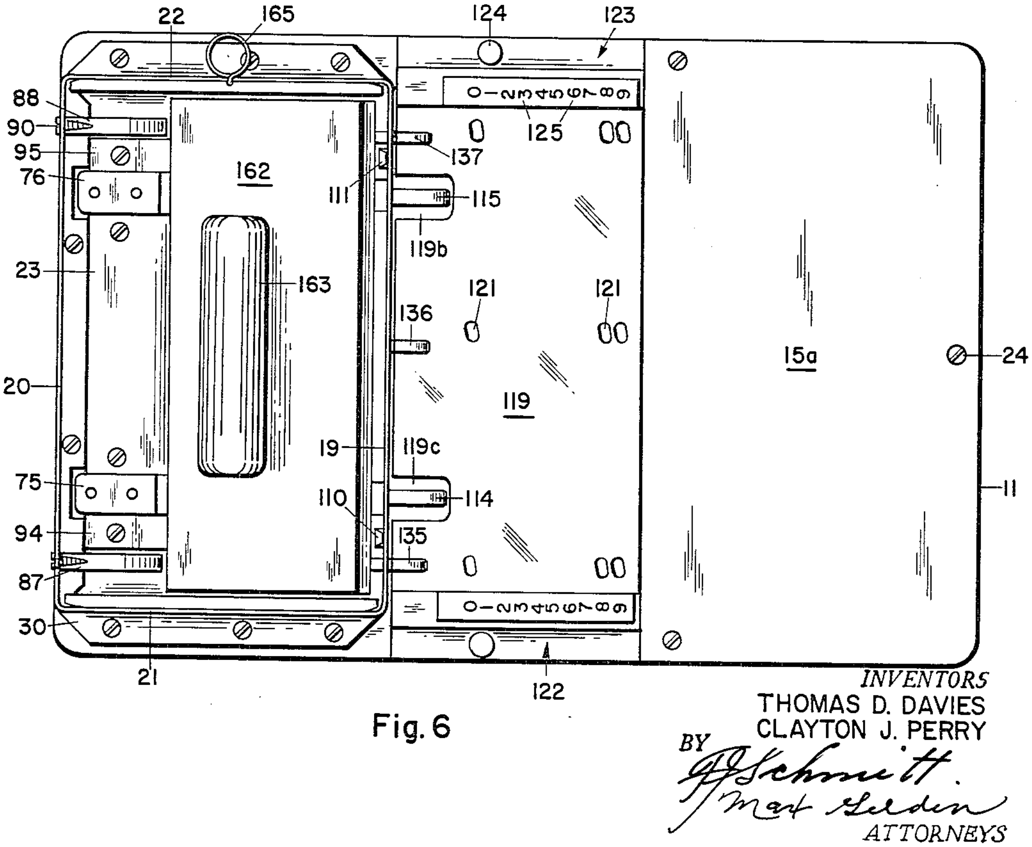
Figure 4:
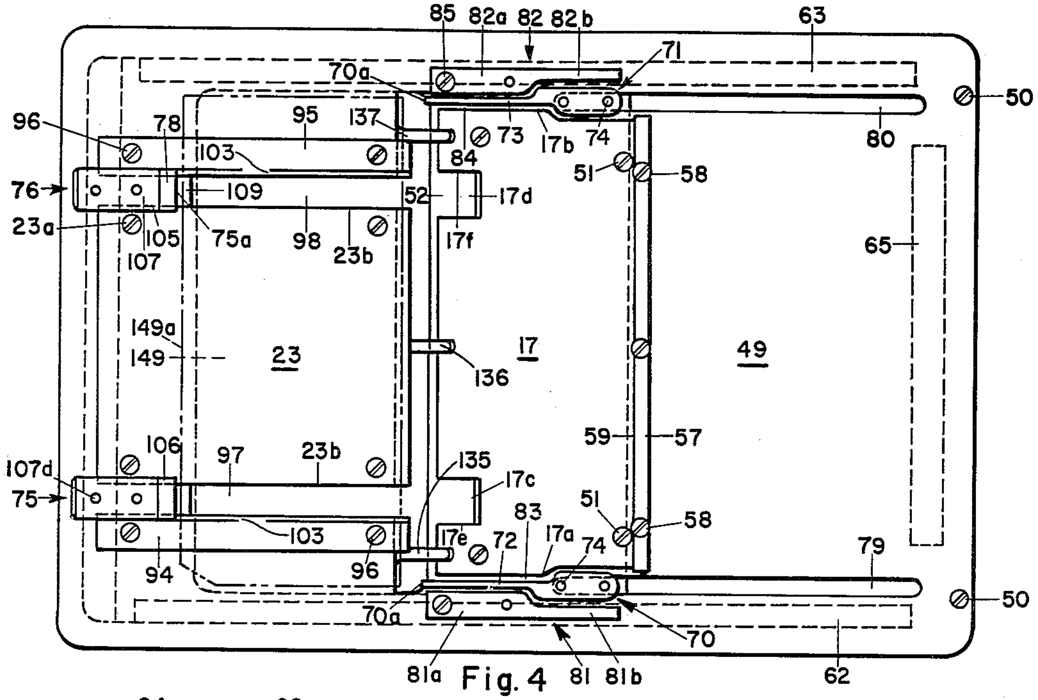
Figure 3:
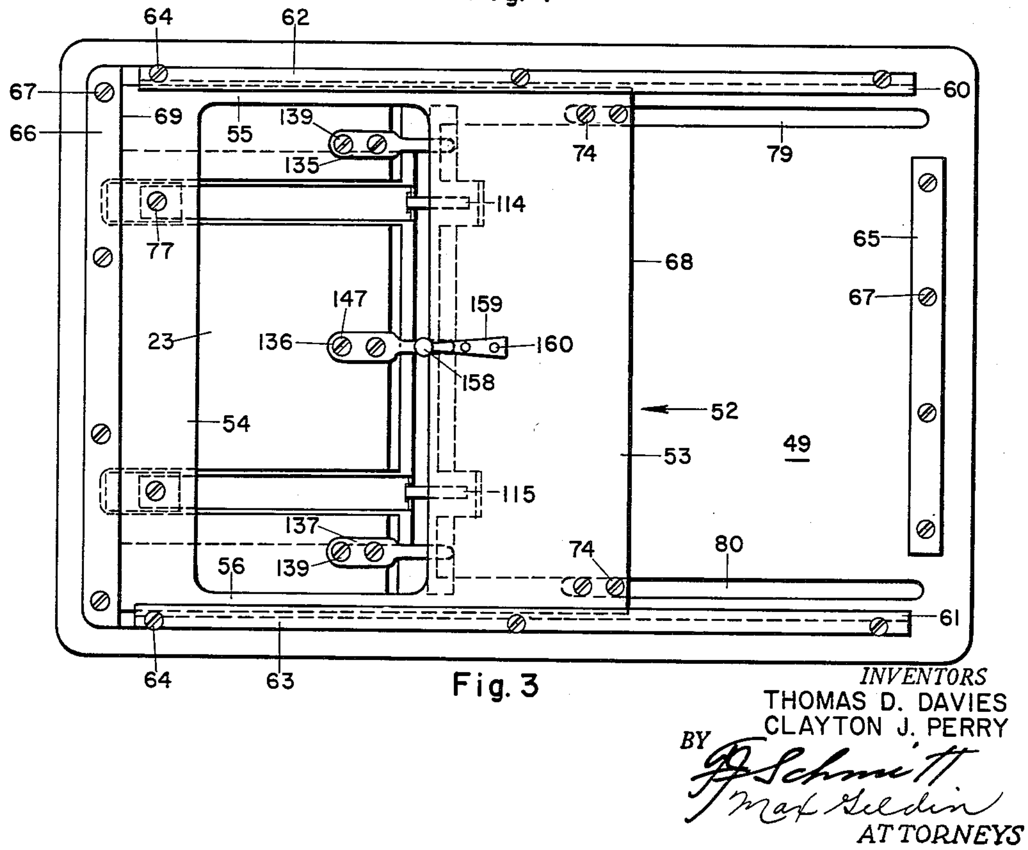
Figure 5:
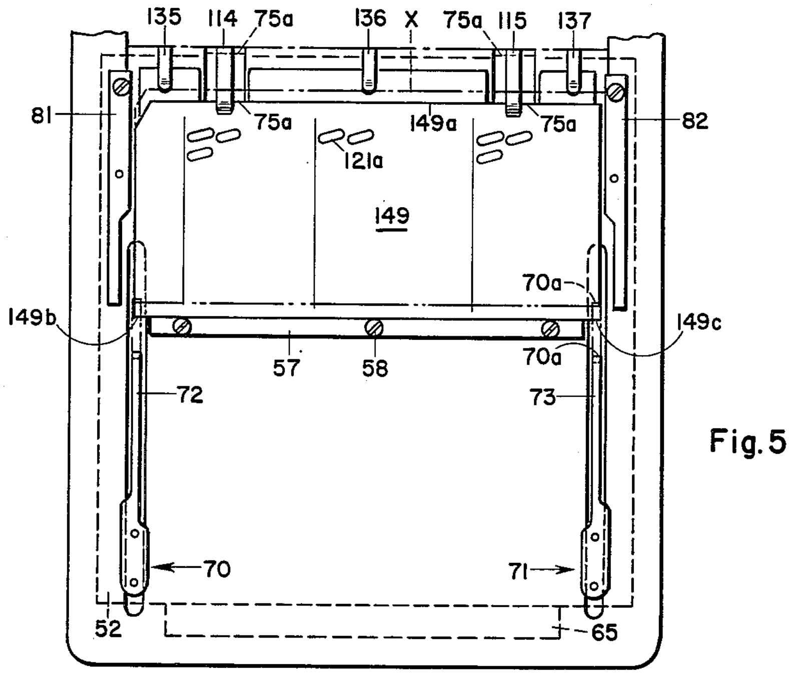
Figure 7:
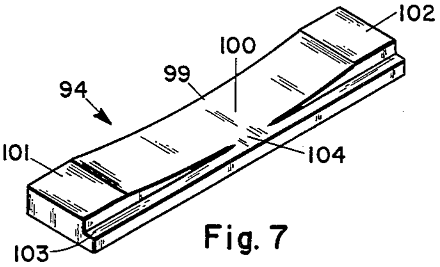
Figure 9A:
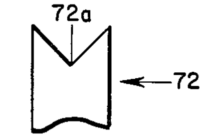
Figure 8:
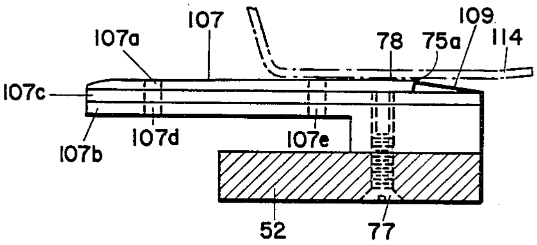
Figure 9:
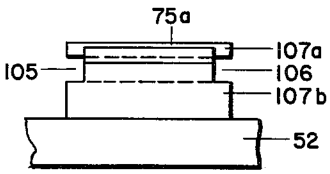

Other objects and many of the attendant advantages of this invention will be readily appreciated as the same becomes better understood by reference to the following detailed description when considered in connection with the accompanying drawings wherein:

Fig. 1 is an isometric view of a device according to the invention, a portion of the device being broken away to show certain details, Fig. 2 is a side view, partly in section, taken along line 2—2 of Fig. 1, and including certain additional details not shown in Fig. 1, Fig. 2*a* is an enlarged view of certain details shown in Fig. 2, Fig. 3 is a plan view taken along line 3—3 of Fig. 1, looking upward in the direction of the arrows, Fig. 4 is a top view of the device of Fig. 1, with the cover plate and card supply compartment removed, and excluding certain other details, Fig. 5 is a top view of a portion of the device of Fig. 1 with the cover plate and card marking template removed, Fig. 6 is a top view of the device as shown in Fig. 2, excluding certain details, Fig. 7 represents a feature of the device of Fig. 1, Fig. 8 is an enlarged side view of another feature of the device of Fig. 1, Fig. 9 is a front view of the feature shown in Fig. 8, and Fig. 9*a* is an enlarged side view of another detail of the device of Fig. 1.

In an embodiment of the invention described in detail hereinafter, a card marking device is provided including a housing having therein a card supply space adapted to contain a stack of cards, a card marking surface in the upper portion of the housing adjacent the card supply space and a card receiving space, preferably located below the card supply space. The device comprises a first means for making contact with one edge of the bottom card in the stack and a second means in the form of a slidable member connected to said first means for moving it and the bottom card both toward and away from the card marking surface, such second means being operated by a third actuating means. In order to permit passage of the bottom card only from the card supply space onto the card marking surface, guide means is provided acting in cooperation with additional means to enable the leading edge of the bottom card only to proceed from the card supply space to the marking surface. Means is also afforded for guiding a marked card away from the card marking surface and toward the card receiving space, such means making contact with the opposite edge of the card from that contacted by the above first means and also attached to said slidable member for movement thereby in a direction to eject a marked card into the card receiving space.

The invention device (1) increases the speed of the marking operation by reducing the amount of card handling, (2) improves the accuracy of the marking operation, (3) protects cards from becoming soiled or mutilated and (4) permits the marking of cards in industrial establishments such as shops and by personnel thereof, heretofore considered to be impracticable and troublesome, and thus enabling the direct transmission of data from its source to the punch-card system.

Referring particularly to Fig. 1 showing one embodiment of the invention, numeral 10 represents a housing having a front wall 11, a back wall 12, side walls 13 and 14, a frame 15 around the upper portion of the housing, a cover plate **15*a*** at the top of the housing at one end thereof and attached to the frame by means of screws 24, and a bottom 16. In the middle of the top portion of the housing and adjacent cover plate 15*a* is a card marking surface or plate 17, and adjacent such plate at the opposite end of the housing from cover plate 15*a* and extending above the main body of the housing is a card supply or card feeding compartment 18 having a front wall 19, a rear wall 20, side walls 21 and 22, and a bottom 23 attached to frame 15 by screws 23*a*. Side walls 21 and 22 of the card feeding compartment each have a curved lower portion 30 which is connected to the frame by means of screws 31. It is noted the top portion of the housing embraced by frame 15 and including bottom 23 of the card feeding compartment, card marking surface 17 and cover plate 15*a*, is substantially in a single plane sloping downwardly from the end of the housing supporting the card feeding compartment to the opposite end of the housing. This is for the purpose of facilitating transfer of a card from the card feeding compartment to the card marking surface 17, as will hereinafter become more fully apparent. The housing may be constructed of any suitable structural material, preferably metal.

In side wall 13 of the housing is a large opening 25 for communicating with the interior of the housing. A door 25*a*, also preferably constructed of metal, is pivotally mounted along one edge by means of a hinge 28 and is positioned to close such opening when desired, e. g. while the device is in use. Near the opposite edge of the door is a knob 26 fastened to the former by means of a screw 27. For purposes of maintaining the door shut on movement thereof to a closed position, a magnet 29 is located on side wall 13 adjacent opening 25 for contact with a portion of the outer end of the door.

As seen in Figs. 1 and 2, a removable partition arrangement 32 is provided, which may be easily inserted and removed from within housing 10 through opening 25. Such partition arrangement comprises two vertically extending end members 33 and 34 connected to a bottom member 37, member 34 being of greater height than member 33, and intermediate these end members another upwardly extending member 35, the upper end of member 35 being bent to form an inclined surface 44 for a purpose which will be apparent below. A downwardly sloping side member 36 extends along the length of the partition arrangement from end member 34 to end member 33, the opposite side of this system being open. A horizontal partition 38 extends from end member 33 to intermediate member 35 and a second sloping partition 39 is connected across end member 34 and intermediate member 35. The various end members and partitions of the foregoing arrangement are suitably connected to each other and the bottom 37 by means of rivets 45.

This partition arrangement accordingly provides a marked card receiving compartment 40 having a sloping bottom to facilitate stacking of the cards which drop into the compartment, a card storage compartment 41 adjacent thereto, and two enclosed compartments 42 and 43 below compartments 41 and 40, respectively, for storage of pencils and other card marking materials. Such partition arrangement may be slidably inserted with its closed side forward into opening 25 of the housing between a pair of opposite guide members 46 and 47 connected to the bottom 16 of the housing by means of bolts and nuts represented by numeral 48. When the partition arrangement is in place within the housing, card receiving compartment 40 is located directly below card feeding compartment 18.

As seen particularly in Figs. 2 to 4, a plate 49 is positioned along frame 15 beneath cover plate 15*a* and card marking surface 17. Plate 49 is attached to frame 15 by bolt and nut means represented by numeral 50. Card marking surface or plate 17 is attached over plate 49 by means of screws 51. Adjacent the lower horizontal edge of card marking plate 17 is positioned a slightly raised strip 57 connected to plate 49 by screws 58, the upper edge 59 of the strip serving as a stop for the lower edge of a card conducted to the card marking surface in the manner hereinafter described. A flat, elongated movable card pickup and ejecting plate 52 is slidably positioned to travel longitudinally back and forth in a plane parallel to and immediately below plate 49, card marking surface 17 attached thereto, and the bottom 23 of the card feeding compartment. Plate 52 has a lower portion 53, an upper portion 54, and two side members 55 and 56 connecting the upper and lower portions. Attached to the undersides of plate 49 and frame 15 along the side edges thereof by screws 64 are two elongated L-shaped members 62 and 63 forming grooves 60 and 61 (see also Fig. 1), the outer edges of plate 52 being slidably engaged within these grooves for movement of such plate from substantially one end to the other of the housing. Stop members 65 and 66 are attached by means of screws 67 to the lower and upper portions, respectively, of plate 49 for engagement of bottom and top edges 68 and 69 respectively of plate 52 to limit longitudinal movement thereof in both directions.

A pair of lower card contacting members 70 and 71, having elongated fingers 72 and 73, respectively, are attached to the top surface of lower portion 53 of movable plate 52 along opposite edges thereof by means of rivets 74. As particularly seen in Fig. 9*a*, the ends of fingers 72 and 73 have notches 72*a* therein constituting card contacting edges 70*a* for engaging the lower edge of a card. At the top portion 54 of movable plate 52 is another pair of card contacting members 75 and 76 attached to plate 52 by screws 77. Members 75 and 76 each have a bevelled end portion 78 extending to form card contacting edges 75*a* for engaging the upper edge of a card. The distance between upper card contacting edges 70*a* and lower card contacting edges 75*a* is somewhat greater than the height of card marking surface 17 for a purpose hereinafter more fully brought out. Longitudinal narrow apertures 79 and 80 are provided in plate 49 closely adjacent members 62 and 63 respectively and parallel thereto, such apertures extending upwardly along the side edges of card marking plate 17 almost to its vertical midpoint. Lower card contacting members 70 and 71 are adapted to slide within these apertures during longitudinal reciprocal movement of plate 52.

Extending alonside the upper portion of apertures 79 and 80 and coextensive with the vertical dimension of card marking surface 17 are two elongated guide members 81 and 82 formed with their upper portions 81*a* and 82*a* of greater width than their lower portions 81*b* and 82*b*, respectively, so as to form narrow elongated passages or grooves 83 and 84 with the adjacent side edges 17*a* and 17*b* of card marking plate 17, to accommodate fingers 72 and 73 of card contacting members 70 and 71 when the latter are moved upwardly to the position shown in Fig. 4 corresponding to the extreme upper position of movable plate 52. Guide members 81 and 82 are attached to frame 15 by means of screws 85. Like horizontally extending raised strip 57, the upper surface of card contacting members 70 and 71 and their adjacent guide members 81 and 82 extend a short distance above the plane of card marking surface 17 for reasons hereinafter more fully discussed.

In card feeding or card supply compartment 18 are two upwardly extending members 87 and 88 positioned parallel to each other closely adjacent side walls 21 and 22 respectively of the compartment. Such members are attached along one edge thereof by means of screws 90 to the rear wall 20 of the card feeding compartment, each of these members having a smooth, vertical opposite edge 89. Members 87 and 88 are preferably constructed of a plastic material such as "Lucite" or "Plexiglas" (methyl methacrylate resin). The vertical edges 89 of such members serve as a guide for the upper edges of a stack of cards to keep the cards properly located one above the other in the card feeding compartment so that each card is in position to be successively contacted and propelled downward toward the card marking surface by the card contacting members 75 and 76.

A pair of elongated outer guide slides 94 and 95 extend longitudinally along the bottom of card feeding compartment 18 from the front wall 19 almost to the rear wall 20 thereof. Such guide slides are each positioned adjacent and parallel to opposite side edges 23*b* of bottom member 23 of the compartment and are spaced a distance from such edges so as to form two elongated apertures 97 and 98 in which card contacting members 75 and 76 respectively slide on movement of plate 52. Guide slides 94 and 95 are connected to frame 15 by means of screws 96. Referring particularly to Fig. 7, showing one of the outer guide slides 94, it is seen that such guide slides have an upper surface 99, the major portion of which is of a slightly concave curvature 100 extending from a point closely adjacent one end of the guide slide to a point closely adjacent the opposite end thereof, end portions 101 and 102 of the glide slide being flat planar surfaces. Longitudinaly positioned along one edge of the guide slide is a flat ledge 103 located a distance below the surface of end portions 101 and 102 such that the center or lowest portion 104 of the concave surface 100 is about flush with the plane of such ledge.

As seen in Fig. 4, one edge of each of card contacting members 75 and 76 is arranged to slide along ledge 103 from one end of a guide slide to the opposite end thereof, while the opposite edge of the card contacting members is adapted to slide along the adjacent longitudinally extending edge 23*b* of bottom member 23 of the card feeding compartment. Hence, it is seen that edges 23*b* of bottom member 23 and the respective adjacent outer guide slides 94 and 95 define guideways for movement of the upper card contacting members 75 and 76 back and forth within apertures 97 and 98 in response to corresponding movements of movable plate 52. For this purpose card contacting members 75 and 76 are each constructed as shown in Figs. 8 and 9. Body portion 107 of each of these members has an upper portion 107*a*, a lower portion 107*b* and an intermediate portion 107*c*, the latter being narrower in width than portions 107*a* and 107*b* and approximately the same width as apertures 97 and 98, forming two slots 105 and 106 within which slidably fit ledge 103 of a guide slide and the adjacent edge 23*b* of bottom member 23. Intermediate portion 107*c* has an end portion 109 which slopes downwardly to its outer edge, the inner edge thereof contacting the extremity of the bevelled end portion 78 of upper portion 107*a* at a height slightly below the bevelled end to form a comparatively sharp card contacting edge 75*a* of a height about equal to the thickness of a single card. Rivets 107*d* and 107*e* hold portions 107*a*, 107*b* and 107*c* together, and screws 77 connect the lower portion 107*b* with movable plate 52.

Attached to the rear surface of front wall 19 of the card feeding compartment 18 by means of screws 112 is a pair of guide fingers 110 and 111 (see Fig. 2), such guide fingers being positioned above the ends of outer guide slides 94 and 95, respectively. Guide fingers 110 and 111 have a curved lower end forming a tip 113 located directly above the respective outer guide slides a distance approximately equal to the thickness of a single card. Tip 113 of each of the guide fingers is preferably formed of hard machine steel such as that known as "Carboloy," enabling close tolerances to be maintained for the height of the passage between the tip and the adjacent guide slide.

The above described structure within the card feeding compartment 18 enables the card contacting members 75 and 76 to make contact through their sharp edges 75*a* with the upper edge 149*a* of the bottom card 149 only (represented in phantom lines in Fig. 4) of a stack of cards in this compartment, as plate 52 commences to move downwardly from the position shown in Figs. 1 to 4 to that represented in Fig. 5. Shortly after such contact with the upper edge of the bottom card is effected and the plate 52, along with card contacting members 75 and 76, proceeds downwardly, the bottom card is shoved slightly ahead of the upper cards in the stack and is bent downward slightly, in accordance with the concave curvature of guide slides 94 and 95 as shown by the phantom line in Fig. 2*a*. This bending of the card which is brought about by the outer guide slides as the card continues to move forward, aids in readily separating the upper surface of the bottom card from the lower surface of the card immediately above it, and prevents the picking up of more than one card at a time by the upper card contacting members. As the lower edge of the card moves forward, it passes under the tips 113 of the guide fingers 110 and 111, and since the space between these tips and the respective guide slides directly below is only about one card in thickness, this structure functions as an additional safeguard in avoiding the passage of more than one card at a time out of the card supply or card feeding compartment and on toward the card marking surface.

In order to direct a card to the card marking surface after the lower edge of the card has been conducted downward from beneath the front wall 19 out of the card feeding compartment, card guide members 114 and 115 are provided below which the card travels on its way to marking surface 17. These members extend from the front wall 19 of the card feeding compartment in a direction toward the card marking surface 17 and in a plane parallel thereto but located slightly thereabove. These guide members are conveniently attached to the inner surface of front wall 19 by means of screws 116 and are positioned substantially in line with the elongated apertures 97 and 98 in the bottom of the card feeding compartment. Along the top edge of card marking surface 17 directly opposite apertures 97 and 98 are two notches 17*c* and 17*d* having the same width as these apertures and into which card contacting members 75 and 76 are adapted to slide by engagement of slots 105 and 106 thereof with the opposite longitudinally extending edges 17*e* and 17*f* of each of the notches. Guide members 114 and 115 are positioned directly above notches 17*c* and 17*d* respectively, and are located at such a height that when card contacting members 75 and 76 pass beneath them, bevelled end portions 78 of such contacting members just make contact with the undersurface of the forward end of these guide members as indicated in dotted lines in Fig. 8. This acts as a safeguard in preventing the upper edge 149*a* of the card from slipping back over the card contacting edges 75*a* of the upper card contacting members 75 and 76 during this period of movement.

A card marking template 119 (see Fig. 1), preferably constructed of a flexible transparent plastic material for easy visibility of a card placed thereunder, is positioned over card marking plate 17. The template has a series of holes 121 therein positioned in vertical columns corresponding to the places 121*a* to be marked on the card (see Fig. 5). The outer edges of the template are positioned over guide members 81 and 82, and its lower edge is made to rest on horizontal strip 57. As pointed out previously, such guide members and strip, as well as the lower card contacting members 70 and 71 are raised a short distance above card marking surface 17 so that when the template is placed in position thereover in the manner indicated, the template is supported in a plane parallel to and slightly above the card marking plate 17 so as to form a space 120 therebetween (see Fig. 2) into which a card to be marked is conducted after passage beneath guide members 114 and 115. As seen in Fig. 1, the top portion 119*a* of the template extends beyond the card marking surface 17 almost to the front wall 19 of compartment 18, and has notches 119*b* and 119*c* therein corresponding to notches 17*c* and 17*d* of the card marking surface. Over the outer edges of the template are placed two side members 122 and 123, and such members and the template are maintained securely in position by means of knurled screws 124 passing into frame 15 of the device. Side members 122 and 123 have numbers 125 thereon corresponding to the horizontally extending columns of holes on the template, for the purpose of readily locating the proper places to be marked on the card.

To further aid in accurate marking of a card, as seen in Figs. 1 and 2, vertically extending column guides 127 and 128 having a set of column numbers thereon corresponding to those on side members 122 and 123, are provided, such column guides being positioned for lateral movement along the template. Front wall 19 of the card feeding compartment has a horizontally extending channel member 126 secured thereon by suitable fastening means (not shown) and column guides 127 and 128 are each bent at right angles near one end thereof to form vertically extending portions 127*a* and 128*a*, the ends of such portions being looped as indicated by numeral 129 to slidably fit within the channel member 126. Looped portions 129 each have attached thereto a threaded bolt 130, and a knurled nut 131 threadably engages the bolt either to tighten column guides 127 and 128 in position or to loosen such column guides to enable them to be laterally moved along the template to a selected location thereon.

For purposes of ejecting a marked card from the card marking surface for passage into card receiving compartment 40 below the card feeding compartment 18, three upwardly curved lip members 135, 136 and 137 are positioned laterally along the bottom edge of the card feeding compartment below the front wall 19 thereof. These lip members are equally spaced laterally opposite the top edge of the card marking surface, the two outer lip members 135 and 137 each being located adjacent the end of outer guide slides 94 and 95 respectively. As seen in Fig. 3, the outer lip members are attached to the undersurface of frame 15 of the device by means of screws 139 and center lip member 136 is attached to the undersurface of bottom member 23 by screws 147. All three lip members curve upwardly extending to a point in about the same plane as that of card guide members 114 and 115, the top portion 119*a* of template 119 being positioned over these lip members.

Thus, it is seen that when a card is being propelled from the card feeding compartment beneath guide members 114 and 115 into space 120 below the template, the card will slide over the ends of lip members 135, 136 and 137 without being hindered to any appreciable extent in its movement toward the card marking surface due to the spring action of such lip members. However, after the card has been marked and the movable plate 52 brought forward so that the fingers 70*a* of lower card contacting members 70 and 71, as shown in Fig. 5, are brought into contact with the outer lower edges 149*b* and 149*c* of the card 149, and the card propelled forward for ejection as plate 52 is actuated in this direction, the forward or upper edge 149*a* of the card is caused to slip under the ends of lips 135, 136 and 137 to the position shown by the phantom line X, and as the card continues to move forward it is guided downwardly toward card receiving compartment 40.

The upper edge of the card marking plate 17 is in the form of a downwardly curved surface 138, as shown in Fig. 2*a*, for the purpose of aiding ejection of the card in the direction of the card receiving compartment. It is noted that lip members 135, 136 and 137 and curved surface 138 form a passage 138*a* enabling the card to be smoothly conducted forward and downwardly into card receiving compartment 40, the inclined lip member 44 of member 35 facilitating dropping of the card bottom downward onto the inclined bottom of the card receiving compartment and preventing the card from flipping over on its face or falling into the adjacent card storage compartment 41. As pointed out previously, the upper card contacting members 75 and 76 are so spaced from the lower card contacting members 70 and 71 that when movable plate 52 is conducted from its position shown in Fig. 5 away from lower stop member 65, and the lower card contacting members 70 and 71 brought forward with the top plate, the extent of travel of plate 52 necessary before lower card contacting edges 70*a* make contact with the bottom edge of the card on the card marking surface is such that during this period of travel the upper card contacting members 75 and 76 and their associated card contacting edges 75*a* will have moved away from the upper edge 149*a* of the card in a direction toward card receiving compartment 18 a distance sufficient to enable the card to be freely ejected without interference, in the manner above described. The position of card contacting edges 70*a* and 75*a* when the card has reached the position indicated by phantom line X are shown in dotted lines in Fig. 5.

Referring to Fig. 1, the mechanism for affecting reciprocal movement of the plate 52 and its associated card contacting members comprises a handle 140 connected to a crank 141, both of these members being located outside the housing adjacent side wall 13 thereof. The handle is rotatably connected to one end of the crank by means of a pin 140*a* and the crank is in turn fixedly connected at its opposite end to a rotatable shaft 142 by means of a nut 143. Shaft 142 extends within the housing and is maintained in position by means of two bearing members 144 and 145 attached to the bottom 16 of the housing by means of bolts 146, the opposite end of the shaft from the crank end being secured against lateral movement of the shaft by means of a cotter pin (not shown).

Rigidly connected to shaft 142 by means of a pin 151 is a link 150, the opposite end of which is riveted at 150*a* to a curved member 152 having a ball 153 at the end thereof. This ball fits into a seat in one end of an elongated socket 154. A connecting rod 155 has one end secured in socket 154 adjacent ball 153, the connecting rod being spring loaded within socket 154 by means of a spring 156. The ball and socket arrangement provides for pivotal motion between member 152 and the connecting rod. The opposite end of connecting rod 155 is secured within a second elongated socket 157 and is spring loaded therein in the same manner as its other end in socket 154. A curved member 159 (see Fig. 2) is connected to the undersurface of lower portion 53 of movable plate 52 by means of rivets 160, the end of such curved member having a ball 158 thereon which is secured within socket 157 adjacent the end of connecting rod 155, enabling pivotal motion to take place between the latter and curved member 159.

It is apparent that when handle 140 is operated to rotate the crank 141 backward, i. e. in a clockwise direction from its position shown in Figs. 1 and 2, shaft 142 and its associated lever mechanism are actuated to cause plate 52 to be moved from its position as seen in Figs. 1 to 4 downwardly until the lower portion 53 of the plate strikes the lower stop member 65, corresponding to the position shown in Fig. 5 attained when the bottom card of a stack of cards has been propelled onto the card marking surface. When handle 140 is operated to rotate crank 141 forward in a counterclockwise direction from its position shown in dotted lines in Fig. 2, corresponding to the down position of plate 52, shaft 142 and its associated lever mechanism are actuated in a direction to propel plate 52 and its associated card contacting members forward to eject the card from the marking surface, such forward movement continuing until the upper portion 54 of plate 52 makes contact with the upper stop member 66. This corresponds to the initial starting position of plate 52 and its attached card contacting members, as shown in Fig. 1.

The spring loaded ball and socket structure of the foregoing lever mechanism for actuation of plate 52, in addition to providing proper pivotal movement of the linkages, affords a shock absorbing action so that when the plate 52 strikes stops 65 and 66 at its opposite limits of travel, the shock of contact will be cushioned to a considerable extent.

In operation, a stack of cards represented by numeral 161 (see Fig. 2) is placed in card receiving compartment 18, and in order to exert sufficient pressure thereon for the card pickup mechanism to operate properly, a weight in the form of a heavy, rectangular wooden member 162 having a handle 163 is placed on the top of the stack of cards. The card receiving compartment is so dimensioned that the top edge 149*a* of the bottom card 149 of the stack is located a short distance below the card contacting edges 75*a* of card contacting members 75 and 76 (see Fig. 4).

Handle 140 is then actuated to rotate crank 141 backward in a clockwise direction as shown in Figs. 1 and 2, and during this time movable plate 52 travels downward bringing card contacting edges 75*a* into engagement with the upper edge 149*a* of the card. As the plate 52 and the card contacting members 75 and 76 continue in this direction, the bottom card only of the stack of cards is propelled in the manner noted above downwardly toward the card marking surface 17. In so doing the lower edge of the card passes beneath tips 113 of guide fingers 110 and 111, and as the card continues its movement in this direction it passes beneath card guide members 114 and 115 and over lip members 135, 136 and 137, and is conducted into space 120 onto the card marking surface below template 119. Just as the lower edge of the card comes to rest in its proper marking position against the upper edge 59 of raised horizontal strip 57 and adjacent the lower edge of the card marking template, movable plate 52 comes to rest against lower stop member 65, preventing further rotation of crank 141. The column guides 127 and 128 may then be adjusted to a selected position for marking, and the cards thereafter marked. If desired, such column guides may be adjusted prior to actuation of the above handle and lever mechanism and before a card is propelled onto the marking plate 17.

When the marking operation has been completed, the operator actuates handle 140 so as to rotate crank 141 in a counterclockwise direction from its dotted line position in Fig. 2 to cause movable plate 52 to move in the opposite direction upward toward its original starting position. As noted above, plate 52 and its associated card contacting members, including the lower card contacting members 70 and 71, travel a short distance upwardly before the card contacting edges 70*a* of the latter come into engagement with the lower edge of the card. When such contact has been affected, continued rotation of crank 141 and consequent movement of plate 52 cause the card to be propelled through its contact with the ends of fingers 72 and 73, in a direction toward the card feeding compartment. When the upper edge of the card strikes the undersurface of the ends of lip members 135, 136 and 137, the direction of the card is diverted downward toward the card receiving compartment 40, and as the plate 52 continues to move back toward its original starting position, the marked card proceeds through passage 138*a* and finally drops into the card receiving compartment 40. When the plate has made contact with the proper stop member 66, the former is once again in the position noted in Fig. 1 ready to pick up and deliver a succeeding card in the stack of cards to the card marking surface, and the operation is repeated.

It is apparent from the above that many modifications of the invention device may be affected by those skilled in the art. Thus, for example, instead of a mechanical actuating mechanism for reciprocal movement of plate 52, an electrically operated mechanism may be employed. If desired, an element in the form of a spring 165 may be attached to the outer surface of one of the side walls of the card feeding compartment (see Fig. 1) to function as a convenient holder for pencils during periods of use of the device. Further, means other than column guides 127 and 128 may be employed as an aid in marking the cards in their proper spaces.

From the foregoing, it is apparent that the invention provides an efficient, easily operated card marking device, filling a real need in the art. The device has a number of important advantages over the prior art. Thus, its use substantially increases the speed of the marking operation by minimizing the extent of card handling. In one embodiment, the invention device permits the operator to load the machine with about 200 cards and to mark the cards continuously without touching the individual cards with his hands, the invention mechanism manipulating each card successively for marking and ejection by a rapid push-pull action of the operator's free hand as described herein, or by pressing a button where the device is designed for electrical operation. By reducing the amount of card handling, the invention device protects cards from becoming soiled, creased or multilated. Accuracy of the marking operation is improved, since the template positioned over the face of the card guides the pencil lead through the exact area to be marked and permits the operator to exert ample pressure on the marking pencil without the attendant danger of extending the mark into the next column. Further, the device of the invention provides a single compact portable storage unit for "mark-sense" cards, eliminating the necessity of storing such supplies in desks or cabinets, and provides an instantaneous visual inventory of cards on hand. The invention device is also sturdy and durable, requiring a minimum of repair and attention if handled with reasonable care.

Obviously many modifications and variations of the present invention are possible in the light of the above teachings. It is therefore to be understood that within the scope of the appended claims the invention may be practiced otherwise than as specifically described.

We claim:

1. A card marking device which comprises a housing having a card supply space in its upper portion adapted to contain a stack of cards and a card receiving space thereunder, a card marking surface in the upper portion of said housing adjacent the bottom of said card supply space, a member slidably movable in a plane parallel to and immediately below the plane of said card marking surface and the bottom of said card supply space, means for operating said movable member, a first set of card contacting members connected to one end of said movable member and adapted to contact the upper edge of the bottom card only of said stack of cards, said card contacting members being adapted on movement of said movable member in one direction to transfer said bottom card to said card marking surface, guide slides for properly conducting said bottom card out of said card supply space, said guide slides having a slightly concave surface, a guide finger positioned above each of said outer guide slides adjacent said card marking surface, the space between said guide fingers and their corresponding outer guide slides being such as to permit passage therebetween and onto said card marking surface of said bottom card only, a second set of card contacting members connected to the other end of said movable member and adapted to contact the bottom edge of said card on said card marking surface, said last mentioned card contacting members being adapted on movement of said movable member in another direction to transfer a card from said marking surface to said card receiving space.

2. In a card marking device of the type described, a flat elongated member slidably movable in a plane parallel to and immediately below the plane of said card marking surface, means for operating said movable member, guides for said movable member, stops limiting forward and backward movement of said movable member, a first set of card contacting members connected to one end of said movable member and adapted to contact the upper edge of the bottom card only of a stack of cards to be marked, said card contacting members being adapted on movement of said movable member in one direction to transfer said bottom card to said card marking surface, guide slides for properly conducting said bottom card out of a card feeding space, said guide slides having a slightly concave surface, a guide finger positioned above each of said outer guide slides at the edge of said card feeding compartment adjacent said card marking surface, the space between said guide fingers and their corresponding outer guide slides being such as to permit passage therebetween and onto said card marking surface of said bottom card only, a second set of card contacting members connected to the other end of said movable member and adapted to contact the bottom edge of said card on said card marking surface, said last mentioned card contacting members being adapted on movement of said movable member in another direction to transfer a card from said marking surface to a card receiving space, and a member for deflecting said card thereinto.

3. A card marking device which comprises a housing having therein a card receiving compartment at one end and a card feeding compartment above said card receiving compartment and adapted to contain a stack of unmarked cards, a card marking surface in the top of said housing adjacent said card feeding compartment, said surface and the bottom of said card feeding compartment being substantially in the same plane, a flat elongated member slidably movable in a plane parallel to and immediately below the plane of said card marking surface and the bottom of said card feeding compartment, means for operating said movable member, guides for said movable member along the sides of said housing, stops limiting forward and backward movement of said movable member, a first set of card contacting members connected to one end of said movable member and adapted to contact the upper edge of the bottom card only in said card feeding compartment, said card contacting members being longitudinally slidable along the bottom of said card feeding compartment in response to movement of said movable member and being adapted on movement of the latter in one direction to transfer said bottom card to said card marking surface, outer guide slides longitudinally extending along the bottom of said card feeding compartment for properly conducting said bottom card out of said last mentioned compartment, said guide slides having a slightly concave surface, a guide finger positioned above each of said outer guide slides at the edge of said card feeding compartment adjacent said card marking surface, the space between said guide fingers and their corresponding outer guide slides being such as to permit passage therebetween of said bottom card only, guiding members disposed intermediate said card feeding compartment and said card marking surface for guiding a card into marking position thereon, a second set of card contacting members connected to the other end of said movable member and adapted to contact the bottom edge of said card on said card marking surface, said last mentioned card contacting members being longitudinally slidable in response to movement of said movable member and being adapted on movement of the latter in another direction to transfer a card from said marking surface to said card receiving compartment, and deflecting members disposed between said card marking surfaces and said card receiving compartment for directing a marked card into said receiving compartment.

4. A card marking device as defined in claim 3, including a card marking template disposed above and parallel to said card marking surface and defining a space therebetween within which said card is conducted for marking, and wherein the distance between said first set of card contacting members and said second set of card contacting members is greater than the longitudinal height of said card marking surface.

5. A card marking device which comprises a housing having therein a card receiving compartment at one end and a card feeding compartment above said card receiving compartment and adapted to contain a stack of unmarked cards, means in said card feeding compartment for maintaining said cards stacked in alignment one above the other, a card marking surface in the top of said housing adjacent said card feeding compartment, said surface and the bottom of said card feeding compartment being substantially in the same plane, a card marking template disposed above said card marking surface and defining a space therebetween adapted to receive one of said cards, a flat elongated member reciprocally movable in a plane parallel to and immediately below the plane of said card marking surface and the bottom of said card feeding compartment, means for operating said movable member, guides for said movable member along the sides of said housing, stops limiting forward and backward movement of said movable member, a first set of card contacting members connected to one end of said movable member and adapted to contact the upper edge of the botttom card only in said card feeding compartment, said card contacting members being longitudinally slidable along the bottom of said card feeding compartment in response to movement of said movable member and being adapted on movement of the latter in one direction to transfer said bottom card to said card marking surface, a first set of longitudinally extending slots in the bottom of said card feeding compartment for guiding said first set of card contacting members, an outer guide slide positioned adjacent each of said slots longitudinally thereof for properly conducting said bottom card out of said card feeding compartment, said guide slides having a slightly concave surface, a guide finger positioned above each of said outer guide slides at the edge of said card feeding compartment adjacent said card marking surface, the space between said guide fingers and their corresponding outer guide slides being such as to permit passage therebetween of said bottom card only, guiding members disposed intermediate said card feeding compartment and said card marking surface for guiding a card into marking position in said space between said card marking surface and said template, a second set of card contacting members connected to the other end of said movable member and adapted to contact the bottom edge of said card on said card marking surface, said last mentioned card contacting members being longitudinally slidable in response to movement of said movable member and being adapted on movement of the latter in another direction to transfer a card from said card marking surface to said card receiving compartment, a second set of longitudinally extending slots along the edges of said card marking surface for guiding said second set of card contacting members, and deflecting members disposed between said card marking surface and said card receiving compartment below said guiding means for directing a marked card into said receiving compartment.

6. A card marking device which comprises a housing having therein a card supply space adapted to contain a stack of cards and a card receiving space, a card marking surface in the upper portion of said housing adjacent said card supply space, card contacting means having a bevelled end portion for engaging the upper edge of the bottom card in said stack, actuating means connected to said card contacting means for moving it and said bottom card in a direction toward said card marking surface, guide means for properly conducting said bottom card out of said card supply space, said guide means having a concave curved surface defining a depression beneath the lower surface of said bottom card for bending said bottom card upon movement thereof in response to movement of said card contacting means such that the major portion of said bottom card is caused to conform to the configuration of said concave curved surface thereby aiding in readily separating the upper surface of the bottom card from the lower surface of the card immediately above it, means associated with said guide means and arranged thereabove to permit the opposite forward edge of said bottom card only to pass between it and said guide means onto said card marking surface, and means for making contact with the opposite edge of said card on said marking surface to conduct a marked card away from said surface, said last-mentioned means being connected to said actuating means.

7. A card marking device as defined in claim 6 including a card marking template positioned above and parallel to said card marking surface, defining a space within which said card is conducted for marking.

8. In a card marking device of the type described, a card marking surface, a member slidably movable in a plane parallel to and immediately below the plane of said card marking surface, actuating means for operating said movable member, a first set of card contacting members connected to one end of said movable member and each having a bevelled end portion for engaging the upper edge of the bottom card only of the stack of cards to be marked, said card contacting members being adapted on movement of said movable member in one direction to transfer said bottom card to said card marking surface, guide means for properly conducting said bottom card out of said card supply space, said guide means having a concave curved surface defining a depression beneath the lower surface of said bottom card for bending said bottom card upon movement thereof in response to movement of said card contacting means such that the major portion of said bottom card is caused to conform to the configuration of said concave curved surface thereby aiding in readily separating the upper surface of the bottom card from the lower surface of the card immediately above it, a second set of card contacting members connected to the other end of said movable member and adapted to contact the bottom edge of said card on said card marking surface, said last mentioned card contacting members being adapted on movement of said movable member in another direction to remove a card from said marking surface.

References Cited in the file of this patent

UNITED STATES PATENTS

| | | |
|---|---|---|
| 378,345 | Valentine | Feb. 21, 1888 |
| 395,499 | McAuliffe | Jan. 1, 1889 |
| 539,598 | Stone | May 21, 1895 |
| 849,655 | Billman | Apr. 9, 1907 |
| 1,026,790 | Douglas | May 21, 1912 |
| 1,027,598 | Dempewolf | May 28, 1912 |
| 1,078,281 | Hay | Nov. 11, 1913 |
| 1,477,920 | Stewart | Dec. 18, 1923 |
| 2,108,799 | Davidson | Feb. 22, 1938 |
| 2,158,505 | Horgan | May 16, 1939 |
| 2,375,296 | Ford | May 8, 1945 |
| 2,402,774 | Rice | June 25, 1946 |
| 2,539,652 | Amberg | Jan. 30, 1951 |